Nov. 26, 1946.  W. D. GOODALE, JR  2,411,537

SUBMARINE SIGNALING SYSTEM

Filed Jan. 28, 1944

INVENTOR
W. D. GOODALE, JR.
BY
W. C. Parnell
ATTORNEY

Patented Nov. 26, 1946

2,411,537

UNITED STATES PATENT OFFICE 2,411,537

SUBMARINE SIGNALING SYSTEM

Walter D. Goodale, Jr., Convent Station, N. J., assignor to Bell Telephone Laboratories, Incorporated, New York, N. Y., a corporation of New York Application January 28, 1944, Serial No. 520,003

3 Claims. (Cl. 181—0.5)

1

This invention relates to submarine signaling and particularly to the testing and calibration of hydrophones used in such signaling systems.

In this testing and calibrating procedure the common practice is to immerse the hydrophone and a wave projector in a body of water a definite distance apart. The projector is supplied with electrical wave energy of adjustable frequency and known intensity and the response of the hydrophone to the projected waves is indicated by means of suitable associated apparatus for comparison with the response of a standard instrument under similar conditions.

When these tests are conducted in small shallow bodies of water or even in larger bodies with the instruments mounted at convenient depths the hydrophone response often varies widely with frequency in a manner which cannot be attributed to any defect in the design. These variations have been found to be caused by waves from the projector being reflected to the pick-up position from the surface of the water and in some cases from the bottom as well. With both direct and reflected wave energy at the pick-up point the wave intensity will vary widely with frequency so that no accurate calibration can be obtained.

The object of this invention is to eliminate these reflected waves at the hydrophone so that an accurate open water calibration can be obtained in any relatively small, shallow body of water which may be readily available.

According to the invention, the surface reflections are eliminated by means of a V-shaped reflecting screen positioned above and between the projector and the hydrophone with the opening of the V at or near the surface of the water. In cases where bottom reflections are not negligible they also may be eliminated by means of a similar screen resting on the bottom in inverted position. With such screens in place but so disposed as to avoid obstructing the direct path between the projector and the hydrophone, the wave components which otherwise would reach the hydrophone by reflection from the surface or bottom, are intercepted and reflected from the walls of the screens in lateral directions nearly parallel with the surface so that they can return to the hydrophone only over a multi-reflection path in which they will be highly attenuated. While very good results are often obtained with the screens disposed transversely with respect to the line joining the projector and hydrophone it is usually preferable to mount them longitudinally parallel with this line and in the same vertical plane, the screens being of sufficient length to extend

2 substantially the full distance between the two devices.

The structure of the screens must be such that they are highly reflective over the working frequency range. In one construction which has been found satisfactory for the purposes of this invention the screens are made up of thin sheet metal tightly enclosing a layer of felt.

Figure 1:
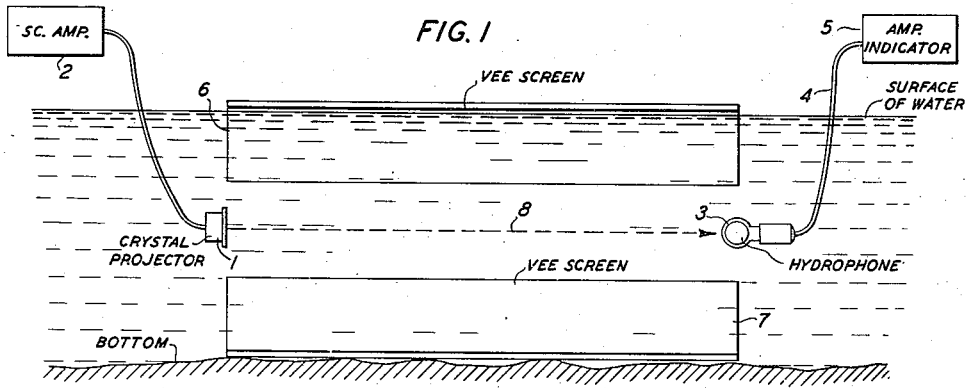
Fig. 1 shows a testing and calibration system using longitudinal screens according to the invention.

In Fig. 1 the wave projector 1 may be of the crystal or any other type suitable for submarine use and is supplied with wave energy of the desired frequencies from a source such as the oscillator-amplifier 2. The hydrophone 3 to be tested is supported at a suitable distance such as eight feet from the projector, both devices being submerged to a convenient depth which may range from four to eight feet. The output of the hydrophone is taken by a cable 4 to amplifying and indicating or recording apparatus 5 which may be mounted together with the amplifier 2 on a dock structure or boat. In any case, it is necessary to locate the projector and hydrophone so that the latter does not receive wave energy by reflection from the dock or boat. When operating from a dock the projector may be disposed so as to radiate from the end of the dock toward a hydrophone supported from a boom at a suitable distance from the end of the dock.

The V screen 6 is supported near the surface above the projector and hydrophone and where, as in the case illustrated, the body of water is very shallow, a similar screen 7 may be placed on the bottom in inverted position as shown. As will be evident from the drawing, these screens will have no effect on energy projected along the direct path 8 from the projector to the hydrophone but the components of the wave front which normally would be reflected to the hydrophone from the surface and bottom are now intercepted by the screens and dispersed in lateral directions. Because of the multiple reflections which will occur near the shore of a small body of water as a result of the acute angle between the surface and bottom, these lateral rays will be attenuated to negligible proportions before returning to the hydrophone position.

Figure 2:
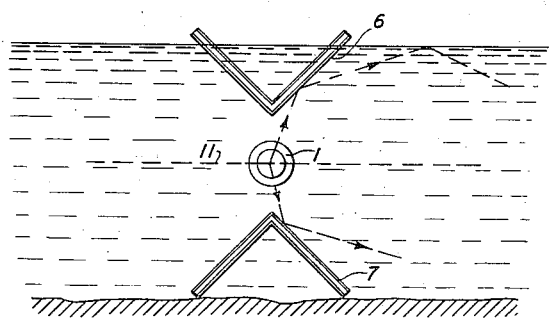
Fig. 2 shows the location of the screens with respect to the line of wave projection.

Similarly when the screens are used transversely as, for example, when the projector and hydrophone are disposed on the line 11 but on opposite sides of the screens as viewed in Fig. 2, it will be evident that the screens may be of suitable size and so spaced as to intercept and deflect away from the hydrophone the wave energy which would otherwise reach it by reflection from the surface or bottom.

Figure 3:
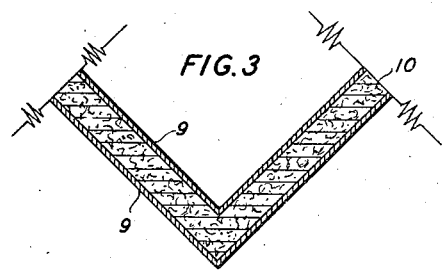
Fig. 3 is a sectional view of a portion of one of the screens.

For hydrophones to be operated over a frequency range extending up to about 50 kilocycles very good results are obtained with screens comprising two $\frac{1}{32}$-inch thick sheets 9, 9, of galvanized iron secured together with a ¼-inch thick layer of felt 10 between them as shown in Fig. 3.

In order to insure that this structure shall operate as a reflector, it is essential that the enclosure for the felt be sealed so that the screen remains free from water while in use. The optimum size of the angle between the sides of the V will vary somewhat with the frequency range being projected and other factors but in general it should be of the order of 90 degrees. The dimensions of the screen along the arms of the V is largely determined by the lowest frequency of interest. Unless this dimension is at least equal to the wave length of the lowest frequency, the lower frequencies will tend to radiate from it in all directions instead of being reflected laterally as a beam as required for proper operation.

For convenience in handling and for use under varying conditions such enclosures may be made up in plane panel form of any desired size, such as two feet by four feet and secured together to form a V of the angle and length required for the particular conditions of each test.

What is claimed is:

1. In a submarine transmission system, the combination with a signal projector and a pick-up device immersed in spaced relation in a body of water, of a reflecting screen of V-shaped cross-section interposed between the projector and the device to intercept signal energy from the projector which would otherwise reach the pick-up device by reflection from the bounding surfaces of the body of water, the arms of the V being at least equal in length to the wavelength of the lowest frequency of interest.

2. In a submarine transmission system, the combination with a signal projector and a pick-up device immersed in spaced relation in a body of water, of means for preventing wave energy from the projector from being reflected from the surface of the water to the pick-up device comprising a V-shaped trough extending above the line joining the projector with the device with the opening of the trough near the water surface, the sides of the trough being constructed to act as reflectors for all the frequencies of the wave energy transmitted by the projector.

3. In a submarine transmission system, the combination with a signal projector and a pick-up device immersed in spaced relation in a shallow body of water, of means for simulating at the position of the pick-up device the sound field which would exist if the device were deeply submerged in a large body of water, comprising at least one V-shaped trough having sides constructed to act as substantially perfect reflectors for all the frequencies transmitted by the projector interposed between the projector and the device and extending along lines parallel with the line joining the projector with the device to leave an unobstructed path between the projector and the device and to reflect in lateral directions wave energy which would otherwise reach the device by reflection from the bounding surfaces of the body of water.

WALTER D. GOODALE, JR.